United States Patent
Fu et al.

(10) Patent No.: US 11,648,853 B2
(45) Date of Patent: May 16, 2023

(54) SEAT ADJUSTMENT AND SENSING SYSTEM

(71) Applicant: Biologue Co., Ltd., Taipei (TW)

(72) Inventors: Chih-Ming Fu, Hsinchu (TW); Ching-Feng Cheng, Taipei (TW); Chia-Yu Yu, Taichung (TW); Yen-Ku Chen, Taipei (TW); Shu-An Lee, Hsinchu (TW); Sheng-Chi Kao, Taichung (TW)

(73) Assignee: BIOLOGUE CO., LTD., Taipei (TW)

( * ) Notice: Subject to any disclaimer, the term of this patent is extended or adjusted under 35 U.S.C. 154(b) by 0 days.

(21) Appl. No.: 17/008,602

(22) Filed: Aug. 31, 2020

(65) Prior Publication Data

US 2021/0380021 A1 Dec. 9, 2021

Related U.S. Application Data

(60) Provisional application No. 63/036,452, filed on Jun. 9, 2020.

(51) Int. Cl.
| | |
|---|---|
| *B60N 2/02* | (2006.01) |
| *B60N 2/64* | (2006.01) |
| *B60N 2/66* | (2006.01) |
| *B60N 2/90* | (2018.01) |
| *B60N 2/806* | (2018.01) |
| *B60N 2/16* | (2006.01) |
| *B60N 2/20* | (2006.01) |
| *B60R 22/48* | (2006.01) |
| *B60N 2/56* | (2006.01) |

(52) U.S. Cl.
CPC ......... *B60N 2/0244* (2013.01); *B60N 2/0232* (2013.01); *B60N 2/16* (2013.01); *B60N 2/20* (2013.01); *B60N 2/5621* (2013.01); *B60N 2/643* (2013.01); *B60N 2/665* (2015.04); *B60N 2/806* (2018.02); *B60N 2/914* (2018.02); *B60N 2/99* (2018.02); *B60N 2/995* (2018.02); *B60R 22/48* (2013.01); *B60N 2002/026* (2013.01); *B60N 2002/0272* (2013.01); *B60N 2002/981* (2018.02); *B60R 2022/4841* (2013.01)

(58) Field of Classification Search
CPC ........ B60N 2/0244; B60N 2/665; B60N 2/99; B60N 2/806; B60N 2/914; B60N 2/995; B60N 2/0232; B60N 2/16; B60N 2/20; B60N 2/5621; B60N 2/643; B60R 22/48
See application file for complete search history.

(56) References Cited

U.S. PATENT DOCUMENTS

| | | | |
|---|---|---|---|
| 2015/0008710 A1* | 1/2015 | Young | B60N 2/914 297/217.3 |
| 2018/0029503 A1* | 2/2018 | Dhaini | B60N 2/66 |

(Continued)

*Primary Examiner* — Syed A Islam
(74) *Attorney, Agent, or Firm* — Muncy, Geissler, Olds & Lowe, P.C.

(57) ABSTRACT

A seat adjustment system for a vehicle seat is provided. The seat adjustment system includes a seat body; at least one actuating unit, configured to adjust a support of the seat body; a sensing unit, configured to obtain and provide seat information and body shape data of a back of an occupant; and a control unit, configured to control the at least one actuating unit; wherein when one parameter of the seat body changes, the control unit makes a portion of the body shape data of the occupant in a pre-defined range via the at least one actuating unit.

6 Claims, 6 Drawing Sheets

(56) References Cited

U.S. PATENT DOCUMENTS

| | | | |
|---|---|---|---|
| 2018/0304774 A1* | 10/2018 | Mizoi | A61B 5/18 |
| 2018/0312083 A1* | 11/2018 | Perez Barrera | B60N 2/01 |
| 2020/0023753 A1* | 1/2020 | Alequin | B60Q 9/00 |
| 2020/0093279 A1* | 3/2020 | Lee | B60N 2/666 |
| 2020/0198511 A1* | 6/2020 | Golles | B60N 2/99 |
| 2020/0223328 A1* | 7/2020 | Kobayashi | B60N 2/0244 |
| 2020/0269726 A1* | 8/2020 | Ohno | B60N 2/0244 |
| 2021/0069521 A1* | 3/2021 | Lee | B60N 2/1853 |
| 2021/0114553 A1* | 4/2021 | Awtar | B60R 22/023 |
| 2021/0146803 A1* | 5/2021 | Wu | B60N 2/0276 |
| 2021/0178934 A1* | 6/2021 | Ellis | B60N 2/06 |
| 2021/0221258 A1* | 7/2021 | Ekchian | B60N 2/809 |

* cited by examiner

Sit down normally

Seat back tilted 30 degrees
The person leans back 30 degrees

SEAT ADJUSTMENT AND SENSING SYSTEM

CROSS REFERENCE TO RELATED APPLICATIONS

This application claims the benefit of U.S. Provisional Application No. 63/036,452, filed on Jun. 9, 2020 and entitled "Seat adjustment system and method with sensor", the contents of which are incorporated herein in their entirety.

BACKGROUND OF THE INVENTION

1. Field of the Invention

The present invention relates to a seat adjustment system and occupant sensing system for a vehicle seat, and more particularly, to a seat adjustment system and occupant sensing system capable of providing an occupant with more comfortable and healthy seating experience to achieve better safety protection and user experience.

2. Description of the Prior Art

Each time an occupant adjusts the seat without addition fine adjustment, it may result in poor sitting posture due to insufficient local support. Adjusting one seat parameter will inevitably make another seat parameter become poor. When the occupant feels tired, it may be too late, or is inconvenient to adjust the seat. Moreover, automatic fine adjustment requires more information of driving environments and traffic conditions. Thus, there is a need to improve over the related art.

SUMMARY OF THE INVENTION

It is therefore an objective of the present invention to provide a seat adjustment system and occupant sensing system capable of providing an occupant with more comfortable and healthy seating experience.

The present invention discloses a seat adjustment system includes a seat body; at least one actuating unit, configured to adjust support of the seat body; a sensing unit, configured to obtain and provide seat information and body shape data of an occupant; and a control unit, configured to modify the support of the seat body through the at least one actuating unit; the control unit makes the a portion of the body data in a predefined range via the actuating unit and the actuating unit can be further changing with time.

The present invention further discloses an occupant sensing system, for a vehicle seat. The occupant sensing system includes a sensor unit, comprising a first sensor and a second sensor, wherein the first sensor is configured to obtain physiological signal of an occupant and the second sensor is configured to obtain environmental signal that does not contain the physiological signal of the occupant; and a computer system, connected to the sensor unit, configured to process the physiological signal from the first sensor and the environmental signal from the second sensor and calculate a signal reliability of physiological information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
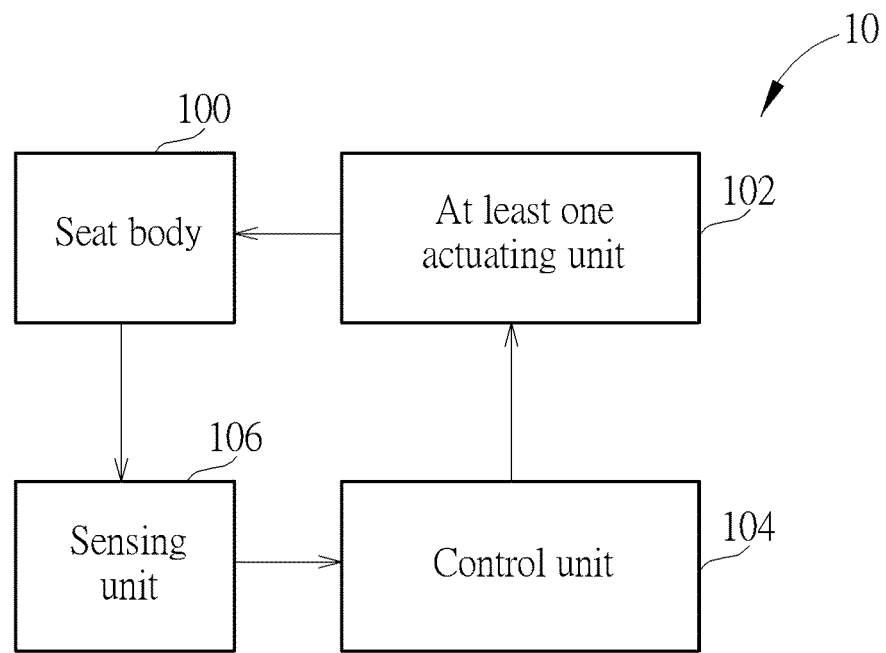
FIG. 1 is a schematic diagram of a seat adjustment system according to an embodiment of the present invention.

Please refer to FIG. 1, which is a schematic diagram of a seat adjustment system 10 according to an embodiment of the present invention. As shown in FIG. 1, the seat adjustment system 10 is utilized for a vehicle seat, and includes a seat body 100, at least one actuating unit 102, a control unit 104, and a sensing unit 106. The at least one actuating unit 102 adjusts support of the seat body 100. The sensing unit 106 obtains and provides seat information and body data of an occupant. The control unit 104 receives data sensed by the sensing unit 106 or an information system, and controls the at least one actuating unit 102 to modify the support of the seat body 100 accordingly through the at least one actuating unit 102. When one parameter of the seat body 100 changes, the control unit 104 makes a portion of the body data of the occupant in a predefined range via the at least one actuating unit 102 (e.g. the control unit 104 send a plurality of control signal to adjust parameters of the at least one actuating unit 102), wherein a portion of the body data of the occupant is corresponding to occupant body part selected from a group consisting of aback, a waist, legs, eyes, a head of the occupant, and the pre-defined range keeps a similar relation between the seat body and the portion of occupant body. For example, when the seat body 100 moves from a first tilt angle to a second tilt angle (i.e. one parameter of the seat body changes the angles of seat back, and a tilt angle may be sensed by the sensing unit 106 via an accelerator or a rotation motor of the seat body 100), the control unit 104 maintains the body shape data of the back of the occupant in a predefined range in the second tilt angle and the first tilt angle, e.g. the at least one actuating unit 102 in the second tilt angle are mapped, and a mapping relationship has a corresponding relationship with body shape parameters of the occupant, where the predefined range can keep the shape of occupant's back identical. Besides, the at least one actuating unit 102 may further adjust rearview mirrors, steering wheel depth, wind direction of air conditioning outlet when the seat body 100 moves from the first tilt angle to the second tilt angle. Noticeable, the at least one actuating unit 102 is selected from a group consisting of a bladder, a motor unit, a seat shoulder support, a lumbar support, a side wing support, a headrest position, a leg support, a cushion hardness and a seat height. The sensing unit 106 is selected from a group consisting of an airflow sensor, a pressure sensor, an occupant detection sensor, an accelerometer, a piezoelectric sensor, an electrocardiogram sensor, a pulse oximetry sensor, a galvanic skin response sensor, a millimeter wave radar, an infrared sensor, a thermal sensor, a ballistocardiograph sensor, a seat belt tension sensor, an input interface for input, a camera for detection, a seat parameter adjustment sensor, and a vehicle information system, such as a brake sensor, a throttle sensor, a steering wheel adjustment sensor, a car start time sensor, a car speed sensor. As a result, when one parameter of the seat body 100 changes (e.g. a seat angle changes) differently, some supporting parts are automatically adjusted to corresponding positions so that the seat body 100 may keep the support for the occupant.

Figure 2:
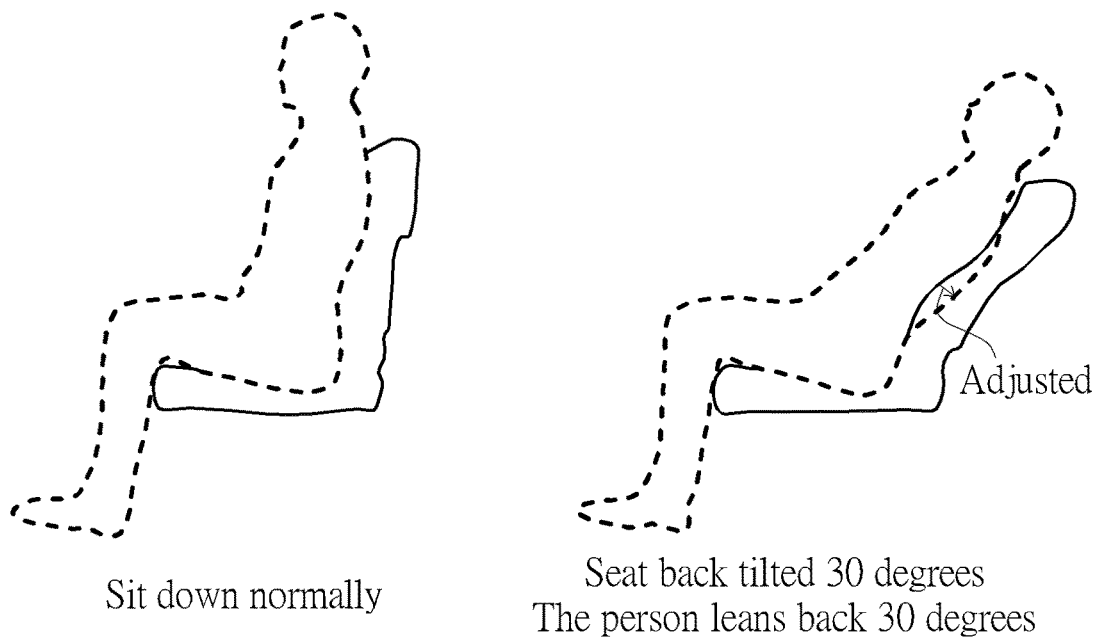
FIG. 2 is a schematic diagram of operations of the seat adjustment system shown in FIG. 1 according to an embodiment of the present invention.

Specifically, please refer to FIG. 2, which is a schematic diagram of operations of the seat adjustment system shown in FIG. 1 according to an embodiment of the present invention. In the left side of FIG. 2, a seat body is adjusted to the most suitable position first (i.e. the back of the occupant in a dotted line matches the supporting curvature of the seat body in a solid line). Then, the seat body reclines by 30 degrees (e.g. from a sitting mode to a stretching mode). Due to different rotation axis between the seat body and the occupant, the seat body will obviously force to the human spine (i.e. the back of the occupant in a dotted line does not match the supporting curvature of the seat body in a solid line as shown in the right side of FIG. 2). If the occupant leans back 18 degrees and the seat body leans back 30 degrees, the occupant will obtain a better support effect on a waist part, but the occupant's shoulder is obviously not supported.

In the embodiment of the present invention, the seat adjustment system 10 includes the at least one actuating unit 102 and parameters of the at least one actuating unit 102 are linked with a mapping function with a corresponding relationship with body shape parameters of the occupant, so that corresponding parts of the occupant maintain similar supporting status. The at least one actuating unit 102 may include a valve motivated bladder or a motor controlled mechanical unit to adjust the support of the seat body 100. The sensing unit 106 may include a pressure sensor to provide information of the body shape data of the back of the occupant to the control unit 104 to estimate a range of body parameters of the occupant for modifying the mapping relationship of the at least one actuating unit 102. Therefore, the body shape data of the back of the occupant can be identical when the occupant leans back and is supported by the modified support of the seat body 100, so that the seat body 100 fits the back of the occupant well. In other words, parameters of the at least one actuating unit 102 are linked changed, and the seat body 100 maintains a similar supporting status for corresponding parts of the occupant.

The support of the seat body 100 may also be adjusted to conform to a posture of the occupant according to a status of the seat body 100. The seat adjustment system 10 may also include an input interface for inputting a user-defined curvature, body type, and support degree (softness or hardness) of the seat body 100.

Figure 3:
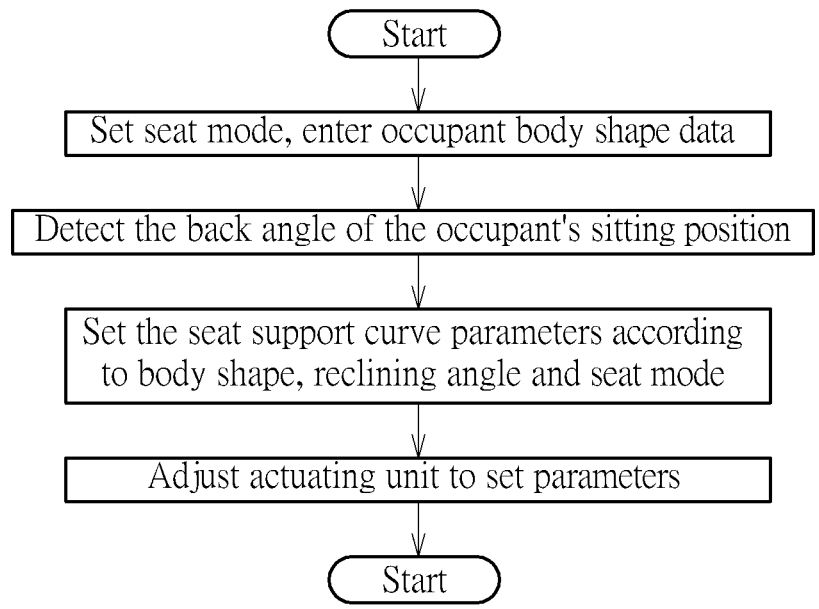
FIG. 3 is a flowchart of operations of the seat adjustment system shown in FIG. 1 according to an embodiment of the present invention.

As shown in FIG. 3, the occupant first sets a seat mode to determine whether to perform adjustment, enters the body shape data of the occupant via an input interface, and sets a seat tilt angle. After setting the curve parameters of the seat body 100 according to the body shape data and the reclining angle, the control unit 104 adjusts the at least one actuating unit 102 to a set parameters, which is derived from a built-in correspondence table or built-in function, wherein the body shape data is obtained by comparing the pressure data of the pressure sensor of the sensing unit 106 and the built-in data by the control unit 104 (or inputted via an input interface or detected by a camera). Afterwards, the control unit 104 adjusts the at least one actuating unit 102 by the body shape data. As a result, the present invention performs adjustment according to the body shape data, thereby allowing different occupants to have the same experience as much as possible to achieve a more comfortable and healthy seating experience.

Figure 4:
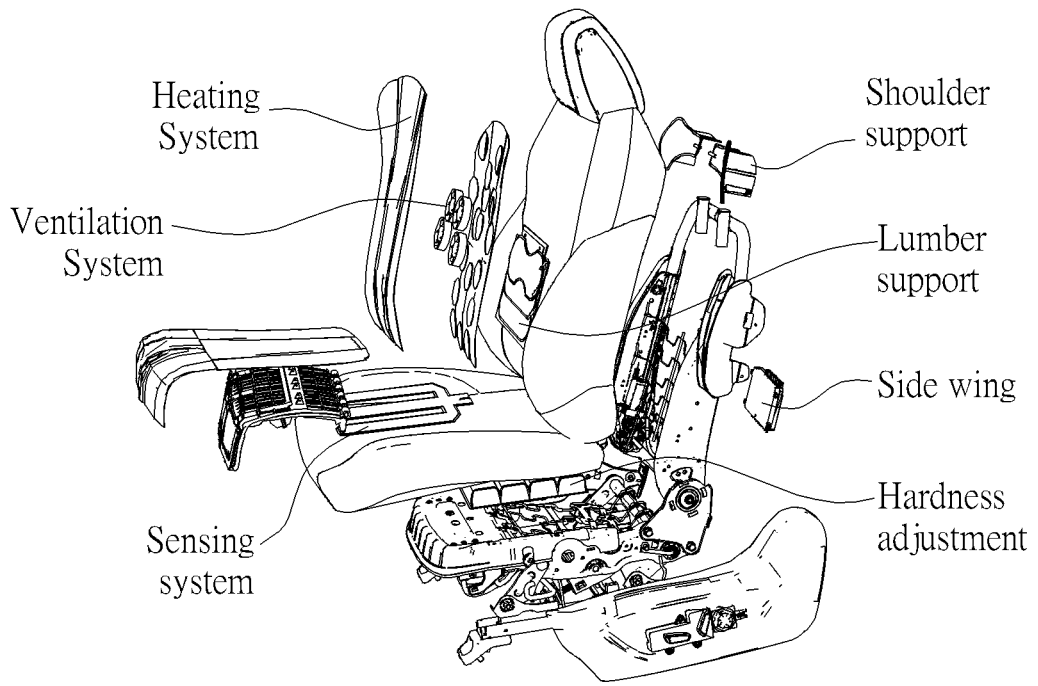
FIG. 4 is an exploded view of the seat adjustment system shown in FIG. 1 according to an embodiment of the present invention.

Please refer to FIG. 4, which is an exploded view of the seat adjustment system 10 shown in FIG. 1. In some embodiments, the sensing unit 106 also senses a sitting posture of the occupant, such that the second parameters of the at least one actuating unit 102 in the second tilt angle and the first parameters of the at least one actuating unit 102 in the first tilt angle form a morphism to keep a similar supporting status to maintain the body shape data of the back of the occupant identical according to the body shape data and the sitting posture of the occupant.

Figure 5:
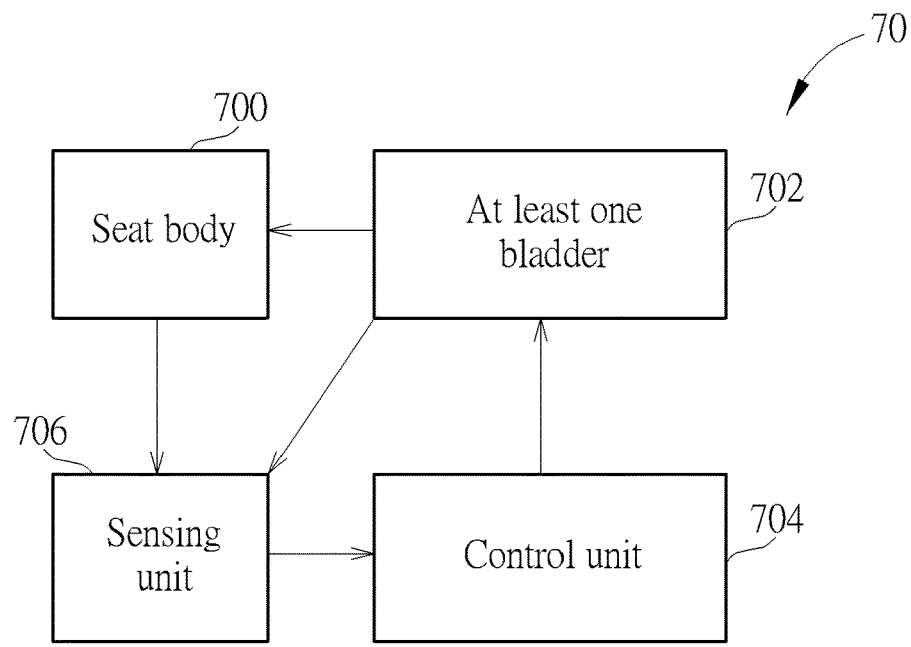
FIG. 5 and FIG. 6 are schematic diagrams of a seat adjustment system according to another embodiment of the present invention.
Figure 6:
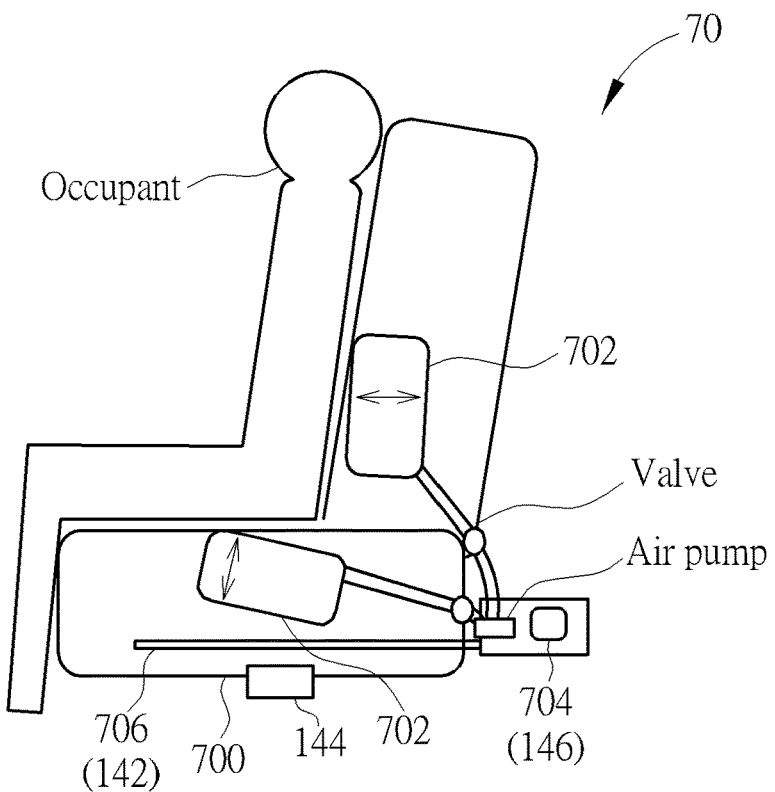

Moreover, to reduce fatigue of the occupant, the support of the seat body may not be fixed and may change in response to time, states of the occupant or environment. As shown in FIG. 5 and FIG. 6, the seat adjustment system includes a seat body 700, at least one bladder 702 (i.e. actuating unit), a control unit 704, and a sensing unit 706. The at least one bladder 702 is inside the seat body 700 and provides support for the seat body 700. The sensing unit 706 obtains and provides a parameter of the seat body 700. The control unit 704 adjusts inflation and deflation of the at least one bladder 702 to change with time according to preset parameters (i.e. the control unit 704 further controls the at least one actuating unit so that the portion of body data of occupant changes around the pre-define range periodically). To avoid disturbing the occupant, the seat support change does not exceed 10%. In addition, a seat state (i.e. a parameter of the seat body) can also be detected in a simplified way. For example, the sensing unit 706 detects a starting time of the vehicle to activate the adjustment. When the starting time of the vehicle exceeds a threshold, such as ten minutes, the seat support changing is activated before the occupant feels fatigue and avoids forgets to turn on the adjustment.

Figure 7:
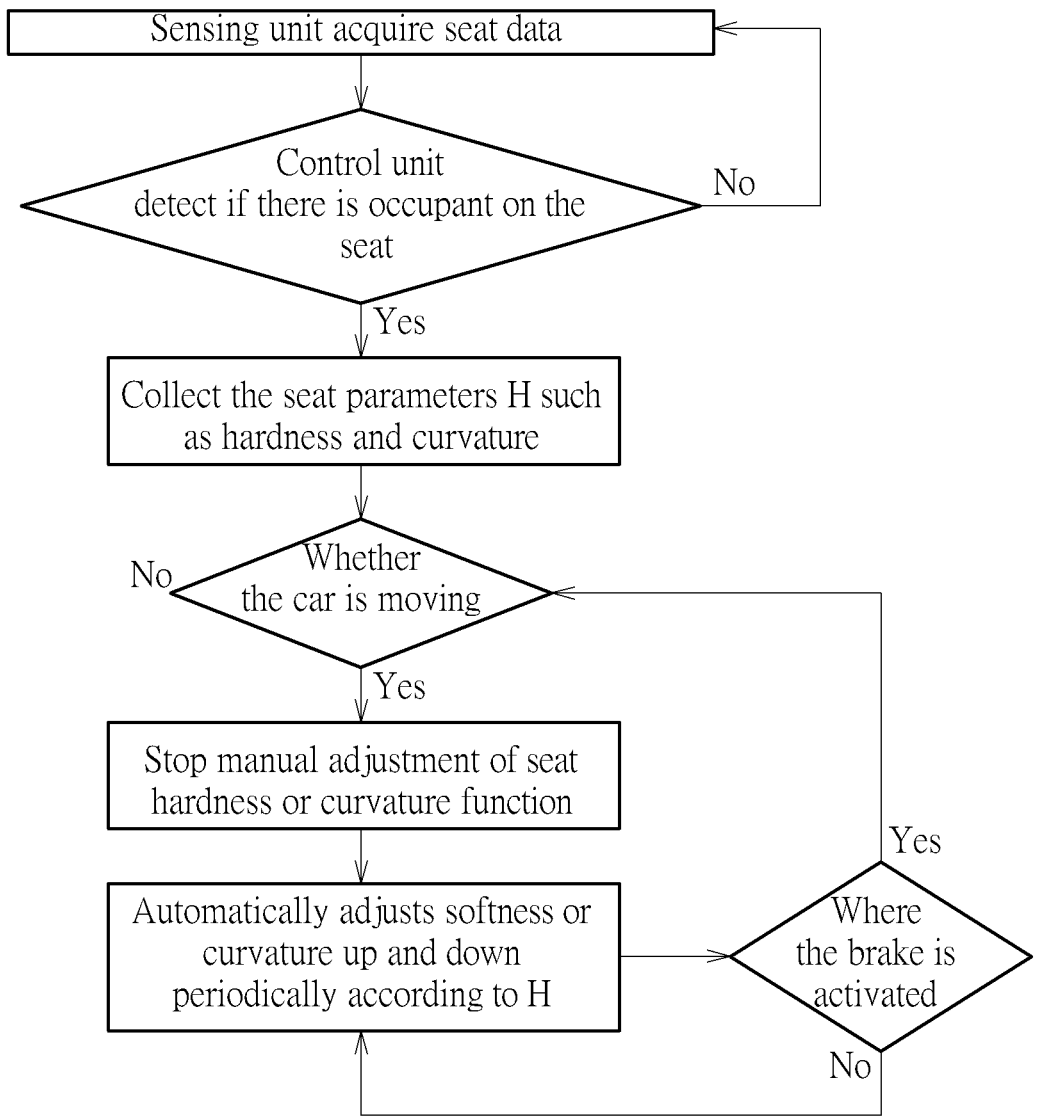
FIG. 7 is a flowchart of operations of the seat adjustment system shown in FIG. 5 and FIG. 6 according to an embodiment of the present invention.

One parameter of the seat body 700 changes is selected from a group consisting of absence of an object on the seat body 700, presence of an occupant on the seat body 700, physiological state of an occupant, and sensed pressure on the seat body 700 due to the occupant contact position, a contact range, a contact time, or a dynamic change. As shown in FIG. 7, the sensing unit 706 acquires the parameter and then the control unit 704 uses the parameter to detect whether there is an occupant on the seat body 700. If yes, the control unit 704 collects seat parameters H such as hardness and curvature. Then, if the vehicle is moving, the control unit 704 automatically adjusts softness or curvature periodically according to the seat parameters H and the manual adjustment of the seat should be stopped until the vehicle stops.

In some embodiments, the control unit 704 controls the at least one bladder 702 inflation and deflation according to a time-varying sequence so that the portion of body data of occupant changes around the pre-define range periodically. When the control unit 704 receives a signal indicating that the change of the brake exceeds a predetermined range or vehicle speed is less than a certain range (i.e. idle or at a low speed), a time-varying sequence of a seat surface by the at least one bladder 702 can temporarily stop. As a result, the occupant may not notice the adjustment when the occupant is not focusing on driving (e.g. idle, at a low speed or in an automatic driving mode), to increase comfort.

Since the present invention modify adjustment in response to states of the occupant, detection of states of the occupant are required.

Please continue to refer to FIG. 6, a seat sensing system includes a sensing unit and a computer system 146. The sensing unit further includes a first sensor 142 and a second sensor 144. The first sensor 142 obtains at least one physiological signal of an occupant by contacting with any part of the occupant. The first sensor 142 is selected from the group consisting of a pressure sensor, an accelerometer, a piezoelectric sensor, an electrocardiogram sensor, a photoplethysmogram sensor, a pulse oximetry sensor, a galvanic skin response sensor, a millimeter wave radar, a camera, an infrared sensor, a thermal sensor, and a ballistocardiograph sensor. The first sensor 142 may also obtain environmental signals from a seat contacted with the occupant, including vibration signals caused by the engine, air conditioner, the occupant's movements and vibrations from the road surface when vehicle is moving. Those vibration lower the reliability of the occupant's physiological signal.

The second sensor 144 obtains the environmental signal (that does not contain the physiological signal of the occupant) from the seat and does not obtain the physiological signal of the occupant. The second sensor is selected from the group consisting of a pressure sensor, a rangefinder, an accelerometer, a magnetometer, a gyroscope, a camera, and a gravity sensor. The physiological signal from the first sensor 142 and the environmental signal from the second sensor 144 are collected by the computer system 146 for processing to calculate a signal reliability of physiological information (obtain vehicle environment and signal reliability via feature extraction, spectrum subtraction, and correlation analysis).

Figure 8:
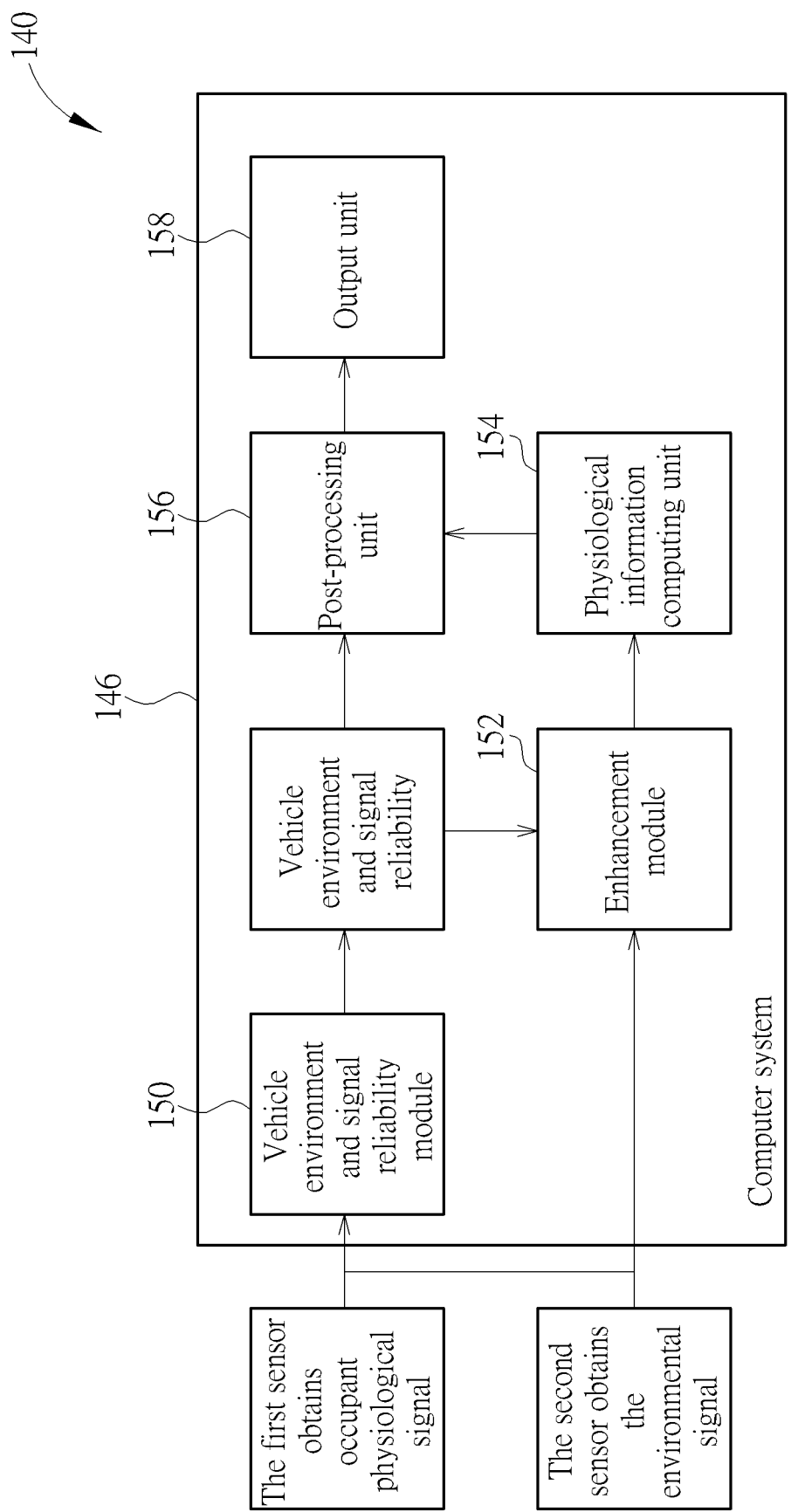
FIG. 8 is a schematic diagram of operations of the occupant sensing system according to an embodiment of the present invention.

In detail, please refer to FIG. 8, which is a schematic diagram of operations of a seat sensing system. 140 according to an embodiment of the present invention. The physiological signal from the first sensor 142 and the environmental signal from the second sensor 144 are first computed by a vehicle environment and signal reliability module 150, to get signal reliability. Then, enhancement module 152 computes physiological information of the occupant according to signal reliability. A post-processing unit 156 evaluates the physiological information with signal reliability and transmits to an output unit 158 (for just updating the reliable physiological information). The physiological information of the occupant s selected from the group consisting of the occupant's breath, heart rate, body type, body pressure, blood pressure, spine compression, and fatigue degree.

Figure 9:
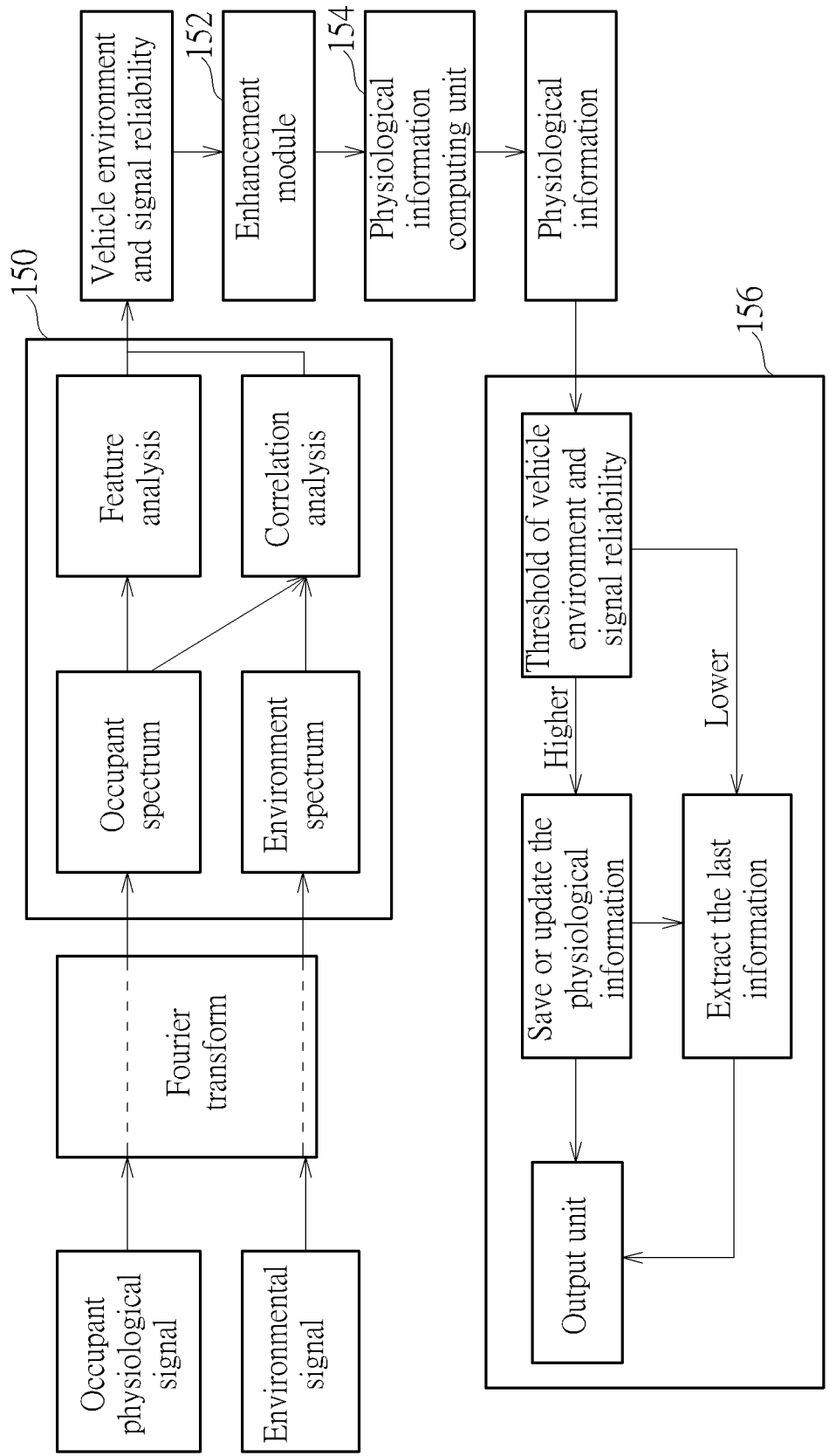
FIG. 9 is a schematic diagram of operations of the computer system according to an embodiment of the present invention.

Please refer to FIG. 9, which is a schematic diagram of operations of the computer system 146 according to an embodiment of the present invention. First, feature projection, such as the Fourier transformation is performed. The occupant spectrum is used for feature analysis such as pattern match and signal-to-noise ratio analysis to evaluate signal quality. Then, a set of decision trees is used to determine the vehicle environment and signal reliability.

For example, the vehicle environment is selected from a group consist of stationary, idling, smooth traveling, bumpy traveling, high speed driving, or low speed driving. Noise from environmental is low when stationary or idle, and thus a correlation between the occupant spectrum and the environment spectrum is low, such that vehicle environment and signal reliability is high. On the other hand, when driving, a correlation between the occupant spectrum and the environment spectrum are high, such that the vehicle environment and signal reliability is low.

After the signal evaluation by evaluating the physiological signal of the occupant from the first sensor 142 with the vehicle environment and signal reliability, the signal enhancement module 152 would enhance the physiological signal (or spectrum) with low reliability. When the vehicle environment and signal reliability is higher than the threshold (indicating stationary or idling, and the physiological information of the occupant is reliable), the enhancement module would be ended and enters the physiological information computing unit 154. Otherwise, the enhanced signal will enter a filter for subtracting the occupant signal with the environmental signal is passed to calculate the physiological information.

The purpose of the post-processing unit 156 is to further utilize the vehicle environment and signal reliability, and keep completely unreliable states from continuous recording of physiological information and avoiding erroneous information with a large gap. For example, please refer to the same FIG. 19, the post-processing unit 156 includes a temporary memory. When the vehicle environment and signal reliability is greater than the threshold, the post-processing unit 156 saves or updates the physiological information at a temporary memory. Otherwise, when the vehicle environment and signal reliability is lower than the threshold, the physiological information will be discarded (or not generated by the physiological information computing unit 154 in the first place) and a last physiological information extracted in the temporary memory would be passed to the output unit 158 as the occupant physiological information at this moment.

The physiological information is selected from the group consisting of a portion of respiration, heart rate, body shape, body pressure, blood pressure, and spine shape. The physiological information can as an input of a seat comfort system, a drunk driving detection system, a fatigue reminder, automatic driving, fatigue reminders, and massage system activation, and the seat adjustment system 10. The computer system is further configured to perform a predetermined action by the reliability of physiological information. The seat sensing system further comprises a output unit for signaling part of computational results of the computer system, e.g., the processed physiological signal (or spectrum), vehicle environment and the signal reliability of physiological information. In some embodiments, the output unit could further updates its results according to the signal reliability of physiological information, where the output unit is selected from a group consist of at least one actuating unit, a display unit, vibration unit, a speaker, a communication system, a output unit of vehicle information system, a light, and a memory. Moreover, the output unit is configured to adjust support of the seat body.

Noticeably, each of the above control units 104, 704 and units of the computer system 146 may comprise a processor and a memory. The memory is configured to store a program code to instruct the processor to achieve respective functions. The memory may be a non-volatile memory (NVM), e.g., an electrically erasable programmable read only memory (EEPROM) or a flash memory, and not limited thereto. The processor may be a digital signal processor (DSP) or a central processing unit (CPU), and not limited thereto.

To sum up, the present invention provides an occupant with more comfortable and healthy seating experience and assisting the occupant to control a vehicle to achieve better safety protection and user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A seat adjustment system, comprising:
   a seat body;
   a plurality of actuating units, configured to adjust supports of the seat body;
   a sensing unit, including a first sensor configured to obtain physiological information of an occupant and a second sensor configured to obtain seat information of the seat body, wherein the first sensor generates at least one physiological signal according to the physiological information, and the second sensor generates at least one environmental signal according to the seat information, and wherein the physiological information includes at least one parameter of the occupant selected from a group consisting of the occupant's breath, heart rate, body pressure, blood pressure, spine compression, and fatigue degree, and the seat information includes at least one parameter of the seat body selected from a group consisting of seat height, angles of seat back, absence of an object on the seat body, presence of an occupant on the seat body, and sensed pressure on the seat body due to the occupant contact position, a contact range, a contact time, or a dynamic change; and
   a control unit, configured to receive the at least one physiological signal and the at least one environmental signal from the sensing unit and control the plurality of actuating units;
   wherein if the at least one environmental signal changes, the control unit transmits a plurality of control signals to the plurality of actuating units, and controls at least one of the plurality of actuating units to adjust the supports of the seat body based on a mapping relationship, and the supports of the seat body are adjusted by the changed actuating unit to make the physiological information of the occupant in a pre-defined range whereby maintaining a relative position between the seat body and the occupant body;
   wherein the mapping relationship is defined as parameters of the plurality of actuating units correlating with the physiological information of the occupant; and
   wherein the control unit further controls the plurality of actuating units to periodically change the physiological information of occupant in the pre-defined range.

2. The seat adjustment system of claim 1, wherein the physiological information of the occupant is corresponding to parts of the occupant body selected from a group consisting of a back, a waist, legs, eyes, a head of the occupant.

3. The seat adjustment system of claim 1, wherein the plurality of actuating units is selected from a group consisting of a bladder, a motor unit, a seat shoulder support, a lumbar support, a side wing support, a headrest position, and a leg support.

4. The seat adjustment system of claim 1, wherein the sensing unit is selected from a group consisting of an airflow sensor, a pressure sensor, an occupant detection sensor, an accelerometer, a piezoelectric sensor, an electrocardiogram sensor, a pulse oximetry sensor, a galvanic skin response sensor, a millimeter wave radar, an infrared sensor, a thermal sensor, a ballistocardiograph sensor, a seat belt tension sensor, a camera, a seat parameter adjustment sensor, a brake sensor, a throttle sensor, a steering wheel adjustment sensor, a car start time sensor, and a car speed sensor.

5. The seat adjustment system of claim 1, further comprising an input interface, wherein the pre-defined range is set by the input interface.

6. The seat adjustment system of claim 1, wherein the control unit controls the plurality of actuating units to temporarily stops the physiological information of occupant periodically changing in the pre-defined range when a brake exceeds a predetermined range or vehicle speed is less than a certain range.

* * * * *